(12) United States Patent
Ukai

(10) Patent No.: US 8,983,719 B2
(45) Date of Patent: Mar. 17, 2015

(54) VEHICULAR DEVICE AND PORTABLE COMMUNICATION TERMINAL

(71) Applicant: DENSO CORPORATION, Kariya, Aichi-pref. (JP)

(72) Inventor: Hiroki Ukai, Nagoya (JP)

(73) Assignee: DENSO CORPORATION, Kariya (JP)

( * ) Notice: Subject to any disclaimer, the term of this patent is extended or adjusted under 35 U.S.C. 154(b) by 129 days.

(21) Appl. No.: 13/687,006

(22) Filed: Nov. 28, 2012

(65) Prior Publication Data
US 2013/0311037 A1 Nov. 21, 2013

(30) Foreign Application Priority Data
May 17, 2012 (JP) ................................. 2012-113469

(51) Int. Cl.
*G06F 7/00* (2006.01)
*G06F 17/00* (2006.01)
(Continued)

(52) U.S. Cl.
CPC ................ *G06F 17/00* (2013.01); *G07C 5/008* (2013.01); *B60K 35/00* (2013.01); *B60K 37/06* (2013.01); *G07C 5/085* (2013.01); *B60K 2350/355* (2013.01); *B60K 2350/357* (2013.01)
USPC ................ 701/36; 701/1; 701/33.2; 701/123; 701/432

(58) Field of Classification Search
CPC ........... G06F 17/00; G06F 7/00; G06F 3/041; G06F 3/14; G06F 3/002; G06F 17/40; G06F 3/023; B60R 99/00; B60R 16/02; G08G 1/20; B60K 2350/1092; B60K 35/00; B60K 15/77; B60K 15/077; B60K 37/06; G07C 5/085; G07C 7/00; G07C 5/00

USPC .............. 701/1, 36, 123, 99, 29.1, 32.6, 34.4; 340/10.41, 10.42, 572.1, 989
See application file for complete search history.

(56) References Cited

U.S. PATENT DOCUMENTS 6,427,115 B1 * 7/2002 Sekiyama ..................... 701/526
8,831,865 B2 * 9/2014 Sengoku et al. .............. 701/123
(Continued)

FOREIGN PATENT DOCUMENTS

| JP | 2002-296040 A | 10/2002 |
| JP | 2003-095399 A | 4/2003 |
| JP | 2013-254477 A | 12/2013 |

OTHER PUBLICATIONS

Office Action mailed Apr. 1, 2014 issued in corresponding JP patent application No. 2012-113469 (and English translation).

*Primary Examiner* — Calvin Cheung
*Assistant Examiner* — Luis A Martinez Borrero
(74) *Attorney, Agent, or Firm* — Posz Law Group, PLC

(57) ABSTRACT

A vehicular device includes a communication unit that performs communication with a portable communication terminal; a display unit that display an execution screen of a terminal application; an operation input unit provided in a corresponding manner with the display unit and receives an input regarding an operation for a manual setting of information used by the terminal application; and a vehicle information acquisition unit that acquires vehicle information regarding a vehicle, which is used by the terminal application. A control unit of the vehicular device sets, to the terminal application, the vehicle information acquired by the vehicle information acquisition unit without using the input from the operation input unit for an execution of the terminal application, and controls a transmission of the vehicle information to the external server through the portable communication terminal by using the communication unit.

16 Claims, 12 Drawing Sheets

(51) Int. Cl.
*G07C 5/00* (2006.01)
*B60K 35/00* (2006.01)
*B60K 37/06* (2006.01)
*G07C 5/08* (2006.01)

(56) References Cited

U.S. PATENT DOCUMENTS

| | | | | |
|---|---|---|---|---|
| 2004/0064337 | A1* | 4/2004 | Nakahara et al. | 705/1 |
| 2005/0246703 | A1* | 11/2005 | Ahonen | 717/172 |
| 2005/0249351 | A1* | 11/2005 | Miyahara | 380/255 |
| 2007/0027593 | A1* | 2/2007 | Shah et al. | 701/30 |
| 2007/0299577 | A1* | 12/2007 | Hattori et al. | 701/32 |
| 2008/0246586 | A1* | 10/2008 | Hiramine | 340/5.72 |
| 2010/0293303 | A1* | 11/2010 | Choi | 710/16 |
| 2010/0305814 | A1 | 12/2010 | Ichikawa | |
| 2011/0098916 | A1* | 4/2011 | Jang | 701/201 |
| 2011/0112719 | A1 | 5/2011 | Marumoto et al. | |
| 2011/0316868 | A1* | 12/2011 | Katou | 345/582 |
| 2012/0041671 | A1* | 2/2012 | Miura et al. | 701/411 |
| 2012/0139922 | A1* | 6/2012 | Heo | 345/440 |
| 2012/0143484 | A1* | 6/2012 | Sawada | 701/123 |
| 2012/0200434 | A1* | 8/2012 | Roberts et al. | 340/994 |
| 2012/0242510 | A1* | 9/2012 | Choi et al. | 340/988 |
| 2013/0137372 | A1* | 5/2013 | Nishidai | 455/41.1 |
| 2013/0144471 | A1* | 6/2013 | Min et al. | 701/2 |
| 2013/0162421 | A1* | 6/2013 | Inaguma et al. | 340/438 |
| 2013/0237189 | A1* | 9/2013 | Nishidai | 455/411 |
| 2013/0289829 | A1* | 10/2013 | Ho et al. | 701/48 |
| 2013/0304308 | A1* | 11/2013 | Maruyama et al. | 701/31.4 |
| 2014/0073254 | A1* | 3/2014 | Ichihara et al. | 455/41.2 |

* cited by examiner

VEHICULAR DEVICE AND PORTABLE COMMUNICATION TERMINAL

CROSS REFERENCE TO RELATED APPLICATION

The present application is based on and claims the benefit of priority of Japanese Patent Application No. 2012-113469, filed on May 17, 2012, the disclosure of which is incorporated herein by reference.

TECHNICAL FIELD

The present disclosure generally relates to a vehicular device and a portable communication terminal that are capable of operating in a cooperative manner.

BACKGROUND

Conventionally, a vehicular device operating cooperatively with a portable communication terminal is known. For example, Japanese Patent Laid-Open No. 2011-8769 (JP '769) discloses a driving diagnosis device that can transmit fuel mileage information to a cellular phone and can display the information on the cellular phone.

Further, in recent years, a network service for having information registered on a server and for utilizing the registered information on the server is prevailing. For instance, a user uses such service through a user interface provided for, for example, from portable communication terminals. Thus, the user executes an application program (i.e., application hereinafter) for having access to such service, and manually inputs or sets the required information through such interface for the registration of information to the server.

More practically, for example, the user manually inputs, through an interface of a fuel mileage registration service, vehicle information such as a travel distance, a consumed fuel amount (i.e., purchased fuel amount) and the like. Therefore, for the user who thinks it tedious to manually input such numbers and information, the fuel mileage registration service is not so convenient and usable, discouraging the user from using such service.

SUMMARY

In an aspect of the present disclosure, a vehicular device and a portable communication terminal cooperatively operate to reduce the cumbersomeness of manual input of vehicle information and the like through execution of a vehicle-related common application.

In particular, the vehicular device executes an application that is common with an application executed by the portable communication terminal. The vehicular device automatically acquires vehicle information regarding a vehicle and sets (i.e., registers) the vehicle information acquired for later use of such information by the application when the portable communication terminal and the vehicular device are respectively performing the application. In such a situation, the vehicular device does not use an operation input unit, which allows a manual input of the vehicle information. In such manner, by freeing the user from the cumbersomeness of manual input of the vehicle information through the operation input unit, the use of such application is facilitated by the vehicular device of the present disclosure.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

The present disclosure is described in the following, with reference to the drawings. In the embodiments and drawings, like numbers represent like parts.

First Embodiment

FIGS. 1 to 11 are used to describe the first embodiment of the present disclosure.

Figure 1:
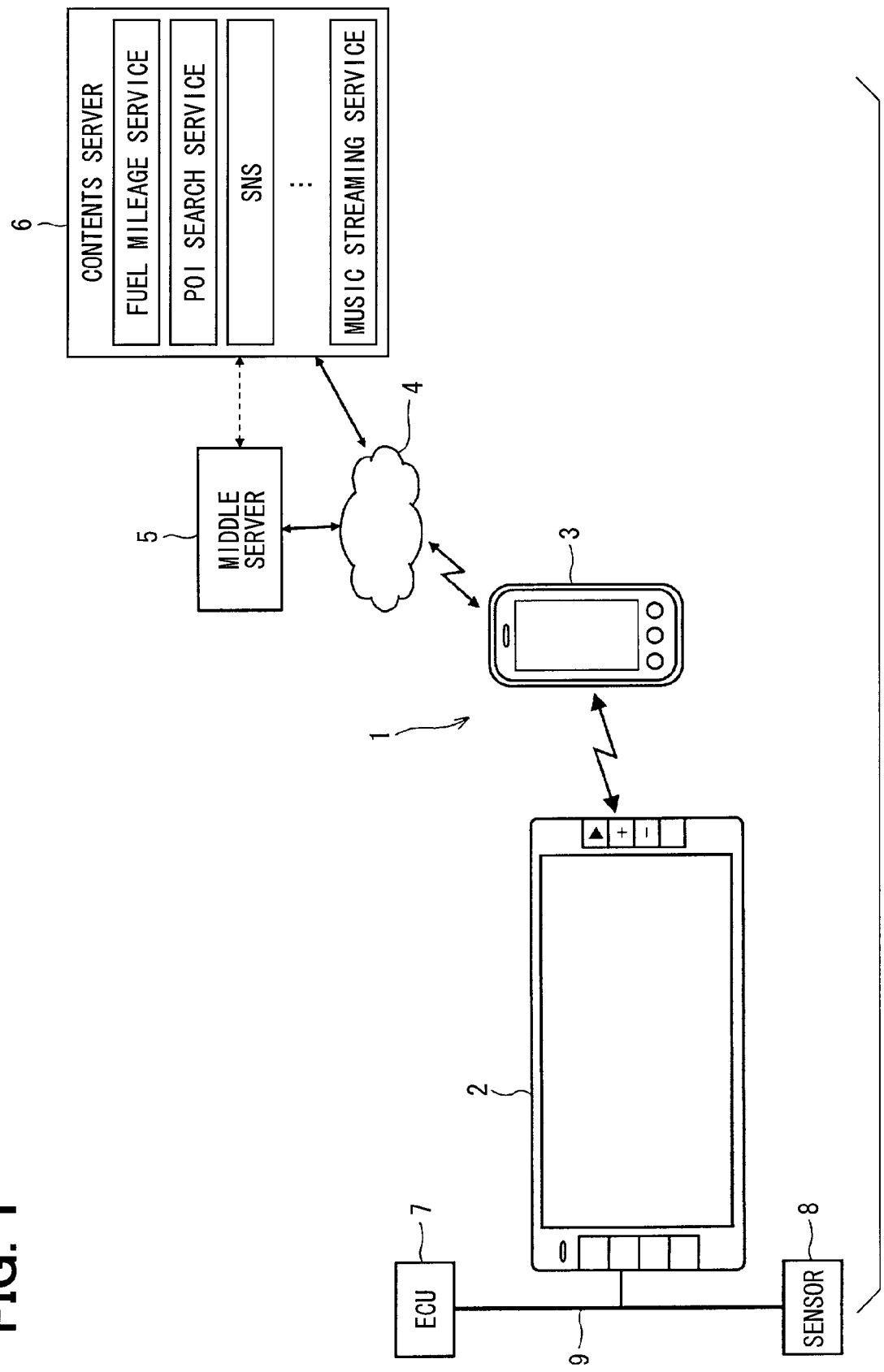
FIG. 1 is a block diagram of a vehicular system of the present disclosure.

With reference to FIG. 1, a vehicular system 1 includes a vehicular device 2 and a portable communication terminal 3. In the vehicular system 1, the vehicular device 2 is communicably coupled to a middle server 5 through an external network 4, to which the portable communication terminal 3 is also communicably coupled therethrough. Further, the vehicular device 2 is also communicably coupled to a contents server 6. The middle server 5 and the contents server 6 may be provided as a server in claims.

In the present embodiment, the vehicular device 2 is installed in a vehicle. In such case, the vehicular device 2 may be fixedly installed in a vehicle compartment, or may be movably/loosely installed in the vehicle. Further, the vehicular system 1 has an electric control unit (ECU) 7 and a sensor 8 respectively connected to Controller Area Network (CAN) 9. The ECU 7 is acquired a travel distance of the vehicle and a speed of the vehicle. The sensor 8, which will be further described in the second embodiment, detects a remaining amount of fuel in a fuel tank and an opening/closing of a fuel lid. The CAN 9 may be replaced with a vehicle network of different types.

Use of information contents in the vehicular system 1 is described first. The vehicular system 1 uses various contents provided by the contents server 6. Available contents are, for example, a point of interest (POI) search service, a social networking service (i.e., SNS), and a music streaming service. Further, these contents may be provided by only one provider, or may be provided by respectively different (i.e., multiple) providers.

In the present embodiment, a fuel mileage service is described from among the available services. Further, in the present embodiment, the vehicular device 2 and the portable communication terminal 3 are respectively capable of executing a common application for a communication terminal, and such application is equipped with a function that is commonly executable on both of the vehicular device 2 and the portable communication terminal 3.

The contents described above are provided in respectively different data formats that may be proprietary to respective providers. Therefore, the middle server 5 is set up between the vehicular device 2, the portable communication terminal 3, and the contents server 6 for converting, to one unified data format, different data formats of the provided contents from respective providers.

Figure 2:
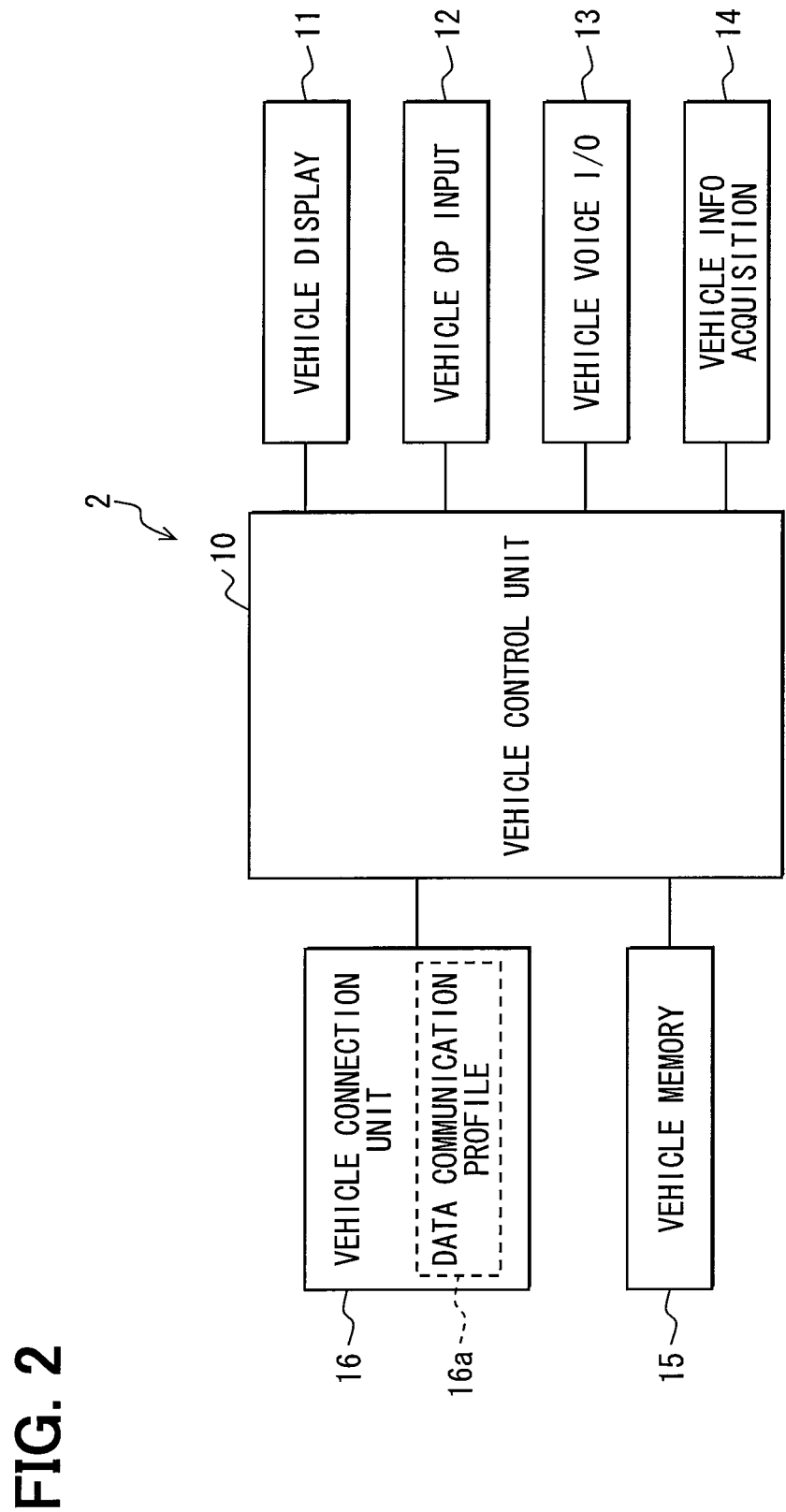
FIG. 2 is a block diagram of a vehicular device in the vehicular system.

With reference to FIG. 2, the vehicular device 2 has a vehicle control unit 10, a vehicle display unit 11, a vehicle operation input unit 12, a vehicle voice input-output (I/O) unit 13, a vehicle information acquisition unit 14, a vehicle memory 15, and a vehicle connection unit 16.

The vehicle control unit 10 is implemented as a microcomputer, which includes a CPU, a ROM, a RAM, and controls the vehicular device 2 as a whole according to a program stored in the ROM. Further, the vehicle control unit 10 is capable of executing an application that operates in a cooperative manner with the portable communication terminal 3.

The vehicle display unit 11 may be, for example, a liquid crystal display unit, an organic electroluminescence display unit or a plasma display unit that is capable of displaying color images. The vehicle display unit 11 displays, for example, an operation screen for operating the vehicular device 2 or a map screen at a time of using a navigation function. Further, the vehicle display unit 11 also displays an operation screen for receiving a user input of fuel mileage data, which is used to input information to the fuel mileage service.

The vehicle operation input unit 12 is implemented as a touch panel on a screen of the vehicle display unit 11, a touch switch around the display unit 11 or the like. The user may input various operations from the vehicle operation input unit 12 for controlling/operating the vehicular device 2. The touch panel may use any method for receiving user inputs, such as a pressure sensing method, an electromagnetic induction method, and an electrostatic induction method. The vehicle operation input unit 12 may serve as an operation input unit in claims together with the vehicle display unit 11.

The vehicle voice input-output unit 13 has a speaker and a microphone. The vehicle voice input-output unit 13 outputs, via the speaker, sound, such as a musical piece and a guide sound stored in the vehicle memory 15. Further, a voice command or operation of the user for controlling the vehicular device 2 is inputted via the microphone of the vehicle voice input-output unit 13.

The vehicle information acquisition unit 14 is coupled to ECU 7 and to the sensor 8 through CAN 9, for the acquisition of various information regarding the vehicle. The vehicle information acquisition unit 14 acquires, from ECU 7 a travel distance of the vehicle and vehicle information representing a travel state of the vehicle. For instance, whether the vehicle is traveling or not (e.g., data regarding parking brake operation, representing that the vehicle is stopping when ON-data of the parking brake operation is output).

The vehicle memory 15 stores, together with other data, musical piece data, map data to be used by the navigation function, various applications to be executed by the vehicular device 2. Further, the vehicle memory 15 also stores the vehicle information.

The vehicle connection unit 16 is used for communication between the vehicular device 2 and the portable communication terminal 3. Such communication is performed by a Bluetooth (a registered trademark) standard. The Bluetooth is abbreviated as BT hereinafter, and connection by the Bluetooth standard is designated as BT connection.

The vehicle connection unit 16 has data communication profiles 16a such as Serial Port Profile (SPP) and Dial-Up Network Profile (DUN), and is connected to the portable communication terminal 3 by using those profiles. The vehicle side connection unit 16 may also serve as a communication unit in claims.

Figure 3:
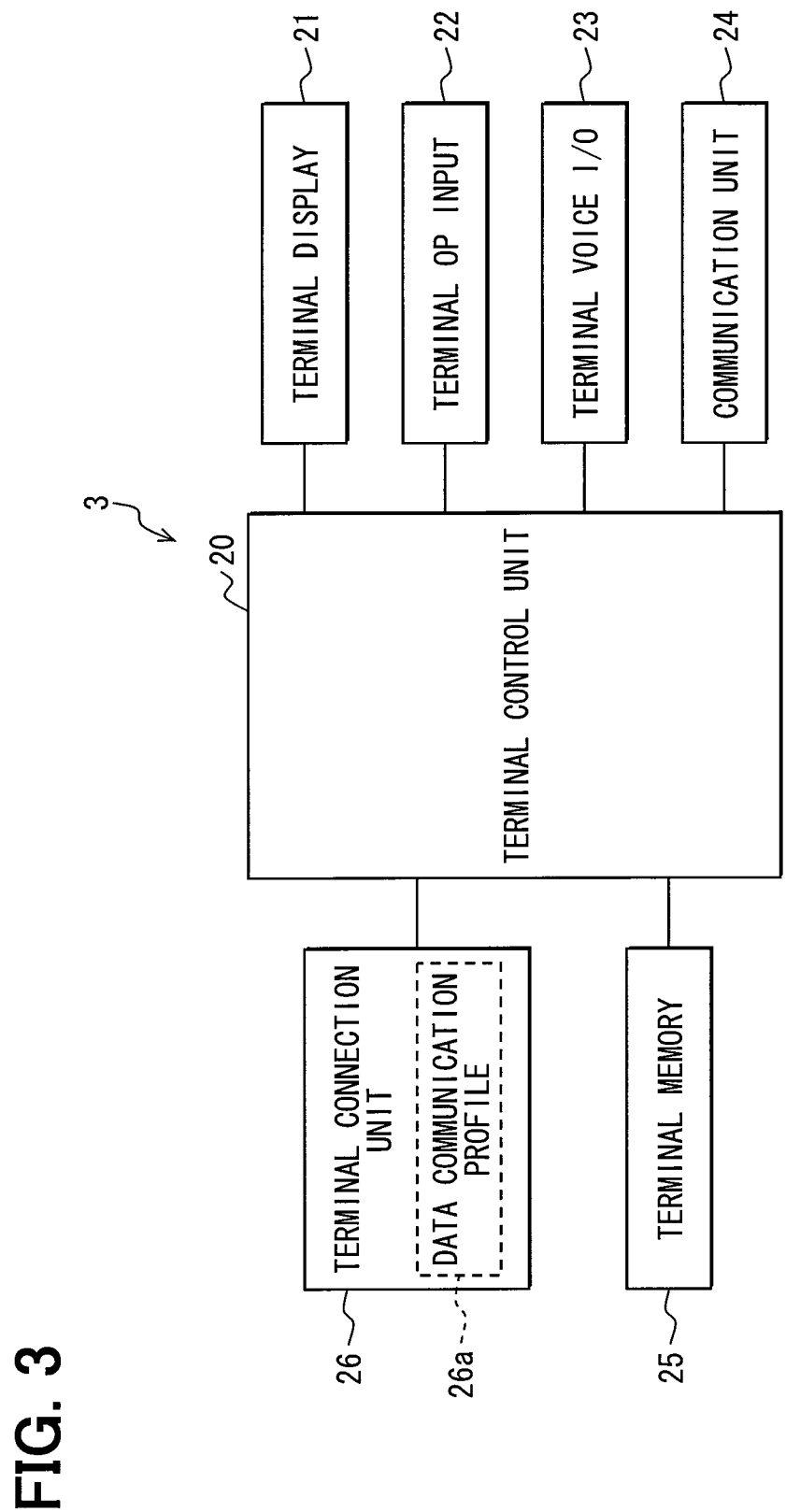
FIG. 3 is a block diagram of a portable communication terminal in the vehicular system.

With reference to FIG. 3, the portable communication terminal 3 has, a terminal control unit 20, a terminal display unit 21, a terminal operation input unit 22, a terminal voice input-output (I/O) unit 23, a communication unit 24, a terminal memory 25, and a terminal connection unit 26. In the present embodiment, the portable communication terminal 3 is assumed to be a smart phone type device.

The terminal control unit 20 is implemented as a microcomputer, including a CPU, a ROM, a RAM, and controls the portable communication terminal 3 as a whole according to a program stored in the ROM. Further, the terminal control unit 20 is capable of communicating with the vehicular device 2, and is capable of executing an application that operates in a cooperative manner with the vehicular device 2.

The terminal display unit 21 may be, for example, a liquid crystal display unit, or an organic electroluminescence display unit that is capable of displaying color images. The terminal display unit 21 may be used to display images and pictures stored in the terminal memory 25, as well as, telephone book data.

The terminal operation input unit 22 is implemented as a touch panel on a screen of the terminal display unit 21 in a corresponding manner, and a touch switch around the terminal display unit 21. The user may input various operations from the terminal operation input unit 22 for controlling/operating the portable communication terminal 3. The touch panel may use any method for receiving a touch input from the user, such as a pressure sensing method, an electromagnetic induction method, and an electrostatic induction method.

The terminal voice input-output unit 23 has a speaker and a microphone, and is used for an input of the speaker's (i.e., user's) voice and for an output of the received (i.e., caller's) voice. The terminal voice input-output unit 23 may output a musical piece and/or a sound/voice stored in the terminal memory 25.

The communication unit 24 performs a wide area communication through a public line network and the network 4. The communication unit 24 sends/receives data to and from the network 4. In addition to telephone book data, musical piece data, the terminal memory 25 stores various applications to be executed by the portable communication terminal 3.

The terminal connection unit 26 performs communication with the vehicular device 2. In the present embodiment, a wireless communication is performed according to the BT standard. Accordingly, the portable communication terminal 3 is connected to the vehicular device 2 through BT connection. The terminal connection unit 26 has data communication profiles 26a, such as SPP, DUN, and the terminal connection unit 26 is connected to the vehicular device 2 by using those profiles. The terminal connection unit 26 may also have a hands-free call profile, such as HFP.

The portable communication terminal 3 may be designated as "SP" in the description of the flowchart. A process performed by the vehicular device 2 is described with reference to FIGS. 4 to 6, and begins when the vehicular device 2 is turned on (i.e., when the ACC key is turned to an ON position).

Figure 5:
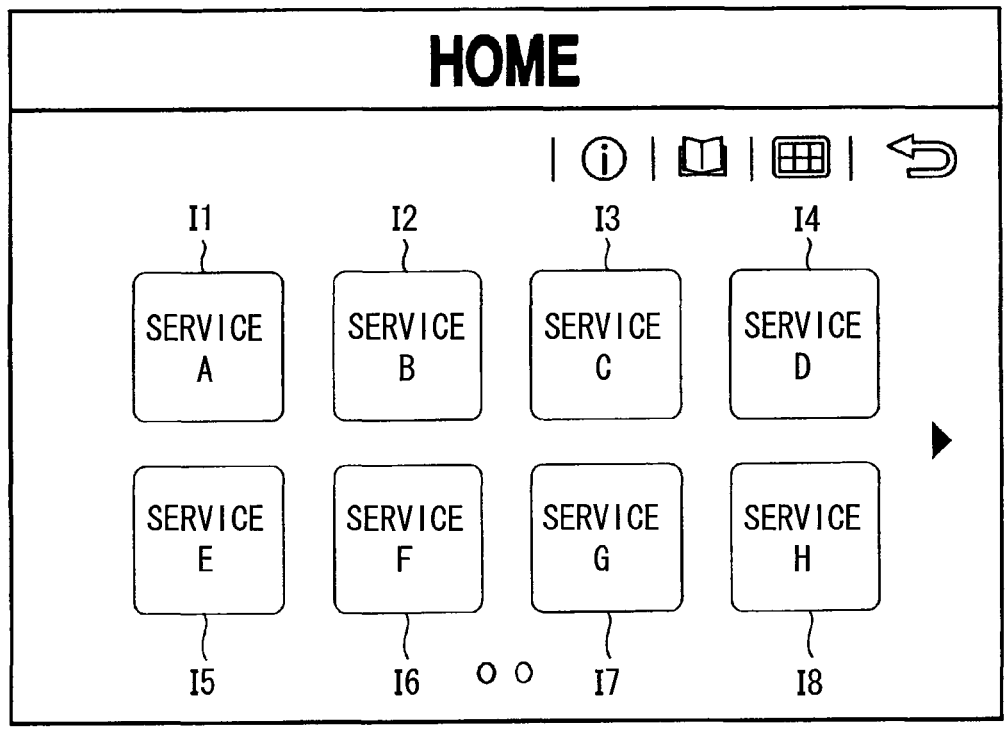
FIG. 5 is an illustration of a home screen displayed by the vehicular device.

At A1, the BT connection is established between the vehicular device 2 and the portable communication terminal 3. The vehicular device 2 then begins a service, at A2. The start of the service indicates that a cooperative operation of the vehicular device 2 with the portable communication terminal 3 has started for the purpose of using the contents provided by the contents server 6 through the portable communication terminal 3. In such case, the vehicular device 2 displays a home screen that includes icons I1 to I8 respectively corresponding to a service A to a service H on the vehicle display unit 11 (FIG. 5). After displaying the home screen, the vehicular device 2 waits for the user to select one of the services displayed, at A2. Each of the applications for utilizing the services may correspond to a terminal application in claims.

The user may choose a desired service by, for example, touching one of the icons I1 to I8. In FIG. 5, the service A is associated with the icon I1, the service B is associated with the icon I2, and the fuel mileage service from the vehicular device 2 (i.e., the service F) is associated with the icon I6. When one of those icons is operated, the associated application is executed by the vehicular device 2, together with other services.

Figure 6:
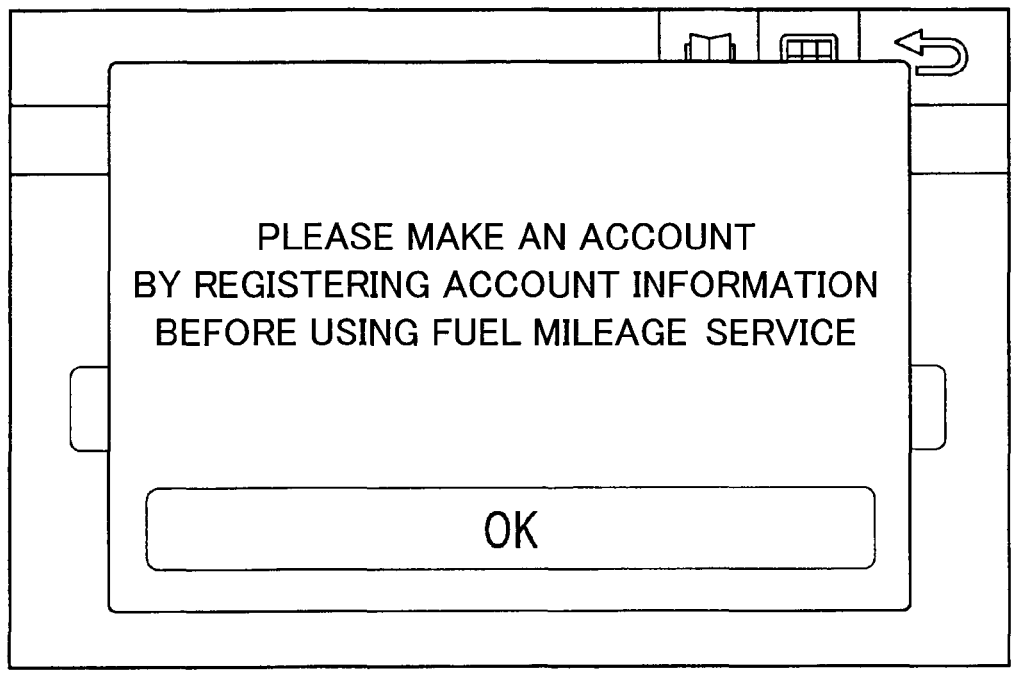
FIG. 6 is an illustration of a registration guidance screen displayed by the vehicular device.

When a service is selected, the vehicular device 2 determines whether the chosen service is providable by the vehicular device 2 (A3). Specifically, it is determined whether a service receive setting has already been performed for receiving a service provided by the contents server 6. For example, the vehicular device 2 determines, prior to using a service, whether an initial setting such as a registration of a user account information has already been performed. If such initial setting has not been performed (A3:NO), the vehicular device 2, at A5, displays an account registration guidance screen (FIG. 6).

If such initial setting has already been performed, the vehicular device 2, at A4, determines that the chosen service is providable (A3:YES), and provides the service by acquiring the contents from the contents server 6 through the portable communication terminal 3, according to a user operation. The vehicular device 2 then determines whether an end instruction is provided, at A6. In other words, the vehicular device 2 continues the provision of the service until the end instruction for ending the provided service is input by the user (A6:NO). Once, the end instruction is received (A6:YES), the vehicular device 2 puts an end to the serve and process.

In such manner, the vehicular device 2 executes an application that provides a service chosen by the user.

The operation of the vehicular device 2 at a time of a user operation for choosing the fuel mileage service is described with reference to FIGS. 7-11.

Figure 7:
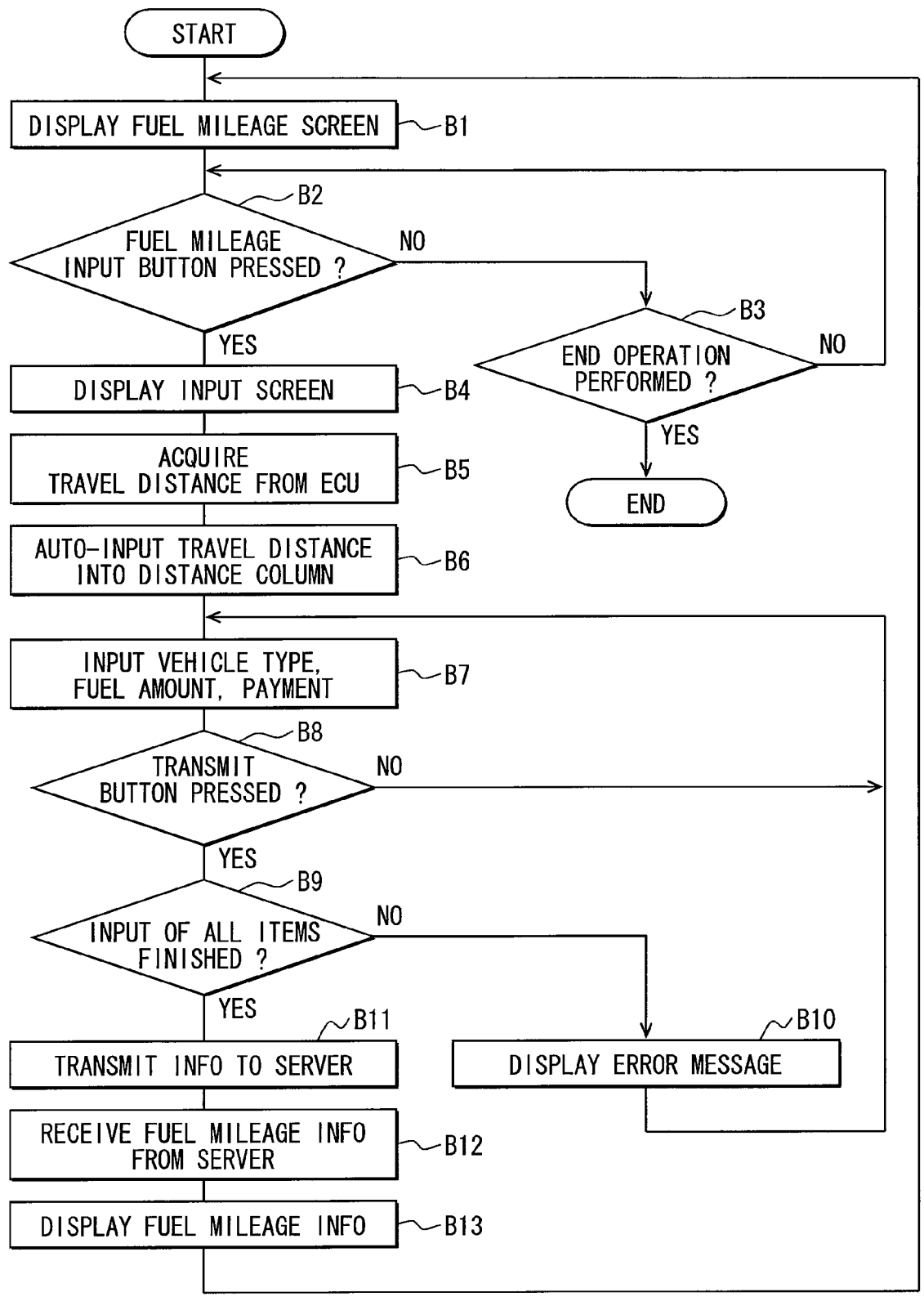
FIG. 7 is a flowchart of a fuel mileage registration process performed by the vehicular device.

With reference to the fuel mileage registration process of FIG. 7, the vehicular device 2, at B1, displays a fuel mileage screen (FIG. 8) upon receiving the user operation of the icon I6, which corresponds to the fuel mileage service. The fuel mileage screen includes a vehicle type display section M1, a data display section M2, and a fuel mileage input button M3.

The vehicle type display section M1 displays, for example, a vehicle image, a vehicle name, and an engine discharge amount of the vehicle. The data display section M2 displays a past fuel mileage, and the fuel mileage input button M3 inputs the fuel mileage.

Figure 8:
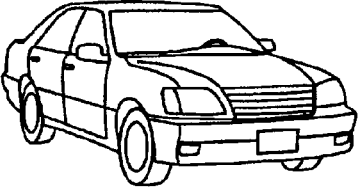
FIG. 8 is an illustration of a fuel mileage screen displayed by the vehicular device.
Figure 9:
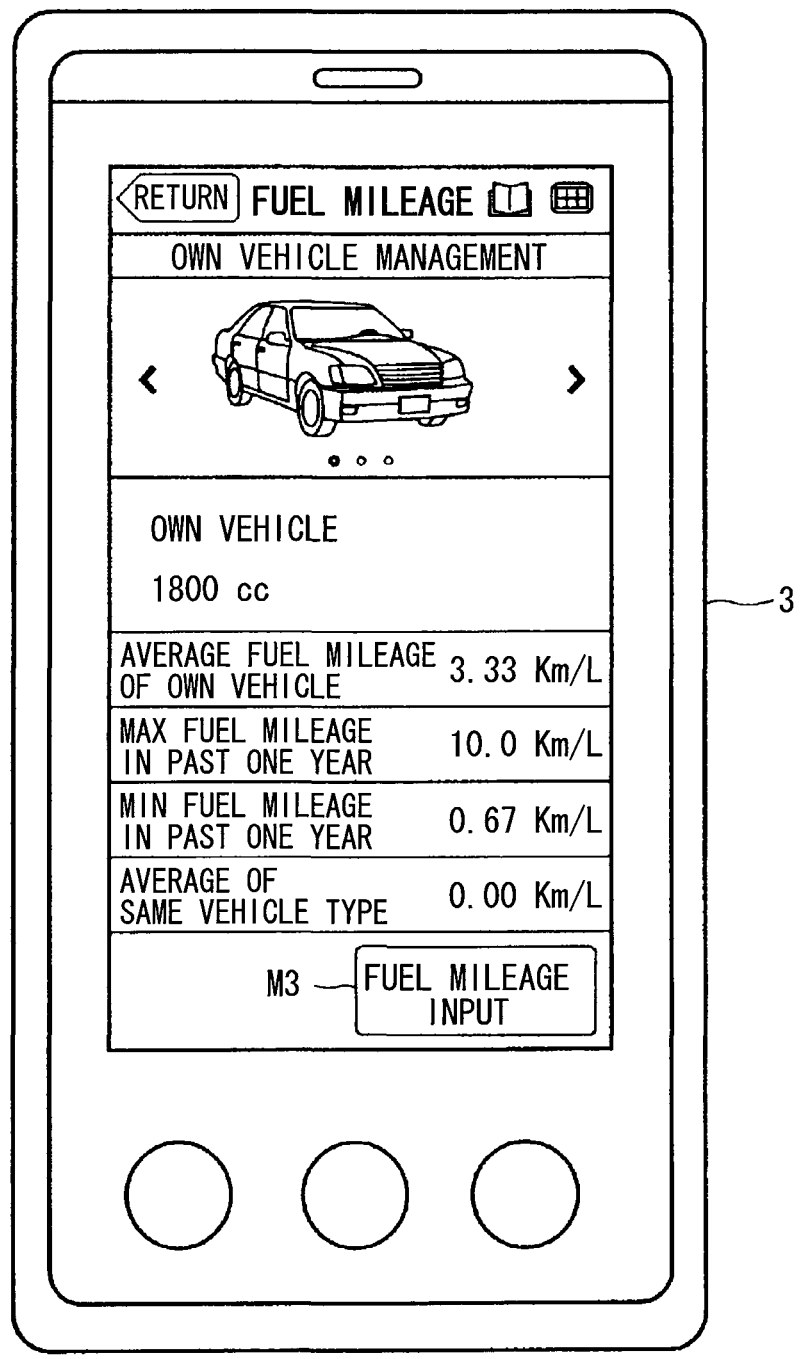
FIG. 9 is an illustration of a fuel mileage screen displayed by the portable communication terminal.

Since the common application can be executed on the portable communication terminal 3, the home screen of FIG. 5 and the fuel mileage screen of FIG. 8 may also be displayed on the portable communication terminal 3, with the fuel mileage input button M3 (FIG. 9). Although, the screen aspect ratio may be changed to correspond with the screen of the portable communication terminal 3. In other words, the terminal application executed on the vehicular device 2 has the common function as the application executed on the portable communication terminal 3, which may include (i) an input function for inputting the fueling amount and the travel distance, (ii) a display function for displaying fuel mileage calculation results based on the calculation on the contents server 6. The following description is based on the screen of the vehicular device 2.

The vehicular device 2 acquires, from ECU 7, information that indicates whether the vehicle is traveling or not by using the vehicle information acquisition unit 14. The vehicular device 2 then restricts the operation of the mileage input button M3 when it is determined that the vehicle is traveling (not illustrated in FIG. 7). That is, for safety reasons, the vehicular device 2 only performs data display while the vehicle is traveling. In such case, the display of the mileage input button M3 may be dimmed, obscured, or the like for visually indicating to the user not to operate the fuel mileage button M3. In the following, the vehicular device 2 is assumed to be in a state not having such restriction.

When the fuel mileage screen is displayed, the vehicular device 2 determines whether the fuel mileage button M3 is operated, at B2, and determines whether an end operation is performed, at B3, when the fuel mileage button M3 is not operated (B2:NO). When the vehicular device 2 determines that the end operation is performed (B3:YES), it displays the home screen (FIG. 5) by concluding the fuel mileage registration process.

On the other hand, when the vehicular device 2 determines that the fuel mileage input button M3 is operated (B2:YES), it displays the fuel mileage input screen (FIG. 10), at B4. The fuel mileage input screen includes: a not-yet input fueling selection section M4 for specifying whether any not-yet input fueling occasion exists after the last update; a fuel type selection button M5 for specifying a fuel type; a travel distance input section M6 for inputting a current travel distance of the vehicle; a fuel amount input section M7 for inputting an amount of fuel; and a payment input section M8 for inputting an amount of payment.

When the user touches the travel distance input section M6, the fuel amount input section M7, or the payment input unit M8 of the fuel mileage input screen, a software keyboard is displayed on the screen, allowing the user to input numbers. The input screen further includes a transmit button M9, for transmitting the inputted information to the contents server 6.

The fuel mileage service assumed in the present embodiment is further described in the following. The contents server 6 providing the fuel mileage service calculates the fuel mileage of the vehicle based on the travel distance regarding the travel of the vehicle and the amount of fuel consumed. More practically, the user inputs the travel distance (i.e., a cumulative value) as an initial value at a time of execution of the application for the first time after fueling the fuel tank to full, and the user inputs the travel distance (i.e., a cumulative value) again at the next fueling time for filling the tank to full.

In such manner, the amount of fuel needed for filling the tank to full is the amount of fuel consumed by the travel of the vehicle between the previous fueling and the current fueling. The fuel mileage is calculated by dividing the travel distance of the vehicle by the amount of consumed fuel (i.e., the amount of fuel needed for filling the tank to full at the current fueling).

Though the manual input of the fuel amount and the travel distance is possible for the calculation of the fuel mileage by the contents server 6, the user may not provide the necessary information, such as the travel distance. For instance, the user may feel inconvenienced or feel the inputting of information as being to cumbersome. Therefore, the vehicular device 2 of the present disclosure employs the automatic input of the travel distance for facilitating the use of the fuel mileage service in the following manner.

With continuing reference to FIG. 7, when the vehicular device 2 displays the fuel mileage input screen, the vehicular device 2 acquires the travel distance from ECU 7, at B5, and then automatically inputs the travel distance acquired (i.e., the vehicle information) into the travel distance input section M6, at B6. Therefore, by automatically inputting the travel distance information, the vehicular device 2 reduces burden or inconvenience felt by the user.

The vehicular device 2 then determines, after receiving the input of the fuel type, the fuel amount, and the payment amount at B7, whether the transmit button M9 is operated, at B8. The vehicular device 2 waits until the transmit button M9 is operated (B8:NO). When the transmit button M9 is operated (B8:YES), it determines, at B9 whether all input items have been filled. If at least one input item is not yet filled (B9:NO), the vehicular device 2 displays an error message, at B10, and returns to B7 for receiving an input.

The vehicular device 2 in B9 not only determines whether all items are inputted, but also determines whether the numbers inputted, such as in the travel distance section M6 and the fuel amount input section M7, are in an appropriate number range. For instance, if the number "500" is provided for amount of fuel in the fuel amount input section M7 for a vehicle of 1800 cc engine displacement, the vehicular unit 2 displays an error message for wrongly inputting such number as fuel amount, because the fuel amount for the vehicle of 1800 cc engine displacement should be around 50 liters and not 500 liters.

Figure 11:
FIG. 11 is a transmission screen displayed by the portable communication terminal.

On the other hand, when it is determined that all the input items are correct (B9:YES), the vehicular device 2 transmits the inputted information, such as the travel distance, the fuel amount, to the contents server 6, at B11. At such time, the vehicular device 2 displays a transmission complete message (FIG. 11). The inputted information may include user account information and the like. When the server 6 receives the inputted information, it calculates the fuel mileage as described above based on the inputted information, and transmits the fuel mileage information back to the vehicular device 2. After receiving the fuel mileage information, at B12, the vehicular device 2 displays the fuel mileage screen, at B13. Further, the fuel mileage information may be displayed on the portable communication terminal 3.

The vehicular device 2 automatically sets the information (i.e., the fuel mileage information in the present embodiment) to be used by the application based on the vehicle information that is acquired from ECU 7, without requiring the user operation on the vehicle operation input unit 12.

According to the present embodiment, the vehicular system 1 achieves the advantageous effects in the following.

When the vehicular device 2 performs the same (i.e., the common) application together with the portable communication terminal 3, while the information to be used by such application may be manually provided from the vehicle operation input unit 12, the same vehicle information acquired by the vehicle information acquisition unit 14 may be automatically provided to the application without requiring the input from the vehicle operation input unit 12. Therefore, the cumbersomeness of the input that may otherwise be felt by the user is diminished.

Figure 10:
FIG. 10 is a fuel mileage input screen displayed by the vehicular device.

The vehicular device 2 is compatible with the fuel mileage service. For the calculation of the fuel mileage by using the fuel mileage service, the user may have to provide three pieces of information, as shown in FIG. 10. However, according to the present disclosure, some of the information may be automatically inputted, thereby diminishing the cumbersomeness of the user.

The vehicular device 2 acquires, as the vehicle information, the information that specifies whether the vehicle is traveling or not, and, when the vehicle is traveling, vehicular device 2 restricts the operation of the fuel mileage input button M3, and obscures the fuel mileage input button M3 on the input screen. In such manner, the safety of the vehicle and its passengers is improved when the vehicle is traveling.

Second Embodiment

The second embodiment of the present disclosure is described in the following with reference to FIG. 12. In the second embodiment, the process at a time of starting up of the vehicular device 2 is different from the first embodiment. Configuration of the vehicular device 2, the portable communication terminal 3, and the vehicular system 1 is same in the first and second embodiments.

In the present embodiment, the sensor 8 is provided as a fuel sensor for detecting the amount of fuel remaining in a fuel tank and a fuel lid sensor for detecting the opening and closing of the fuel lid. The fuel sensor may be configured to detect the amount of fuel by number (e.g., 5 liter or the like) or detect the fuel roughly as "near-empty," "middle," and "full" or the like. By supplying electric power from a battery to the fuel lid sensor in order to compensate for the lack of electric power supply due to the stop of the engine operation during fueling, information regarding the opening and closing of the fuel lid may be recorded by the fuel lid sensor.

Figure 4:
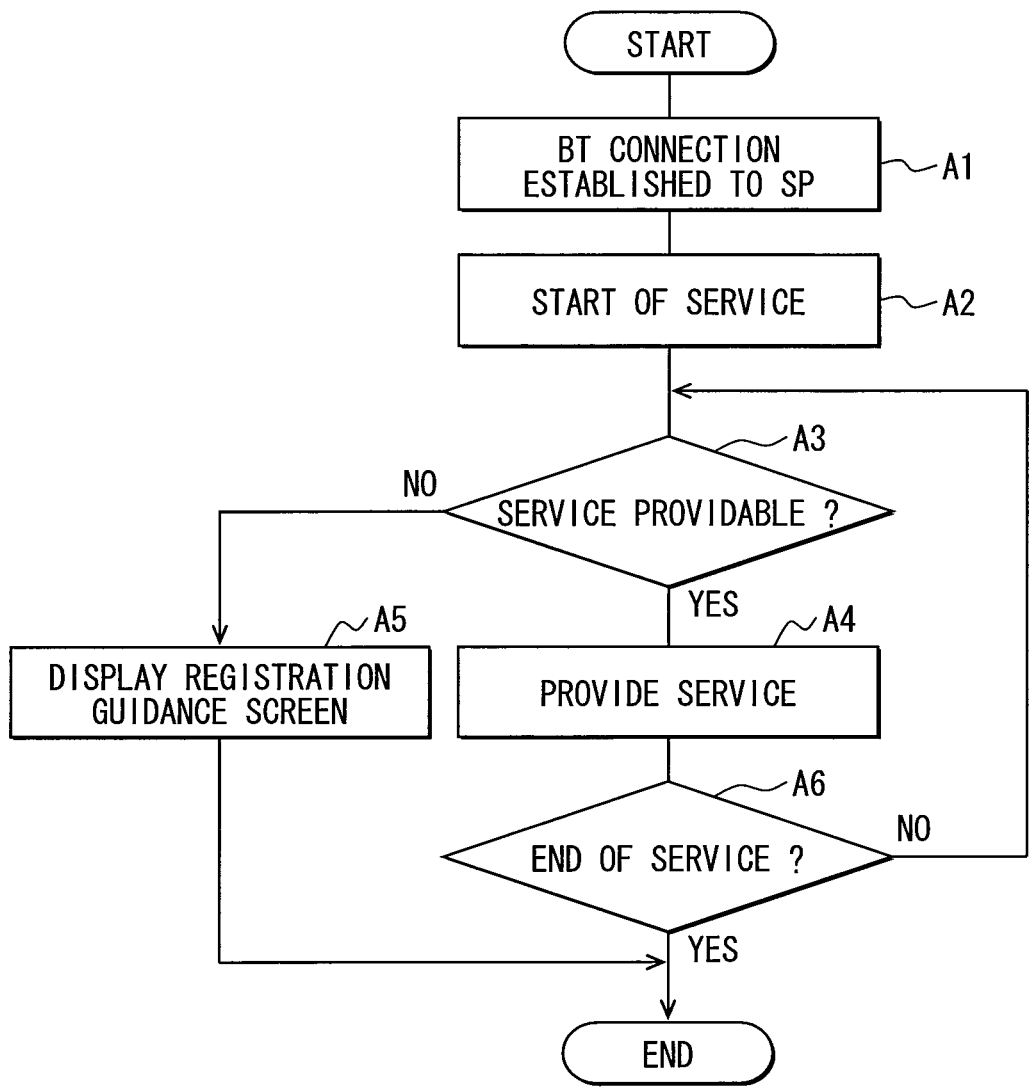
FIG. 4 is a flowchart of a control process performed by the vehicular device in a first embodiment.
Figure 12:
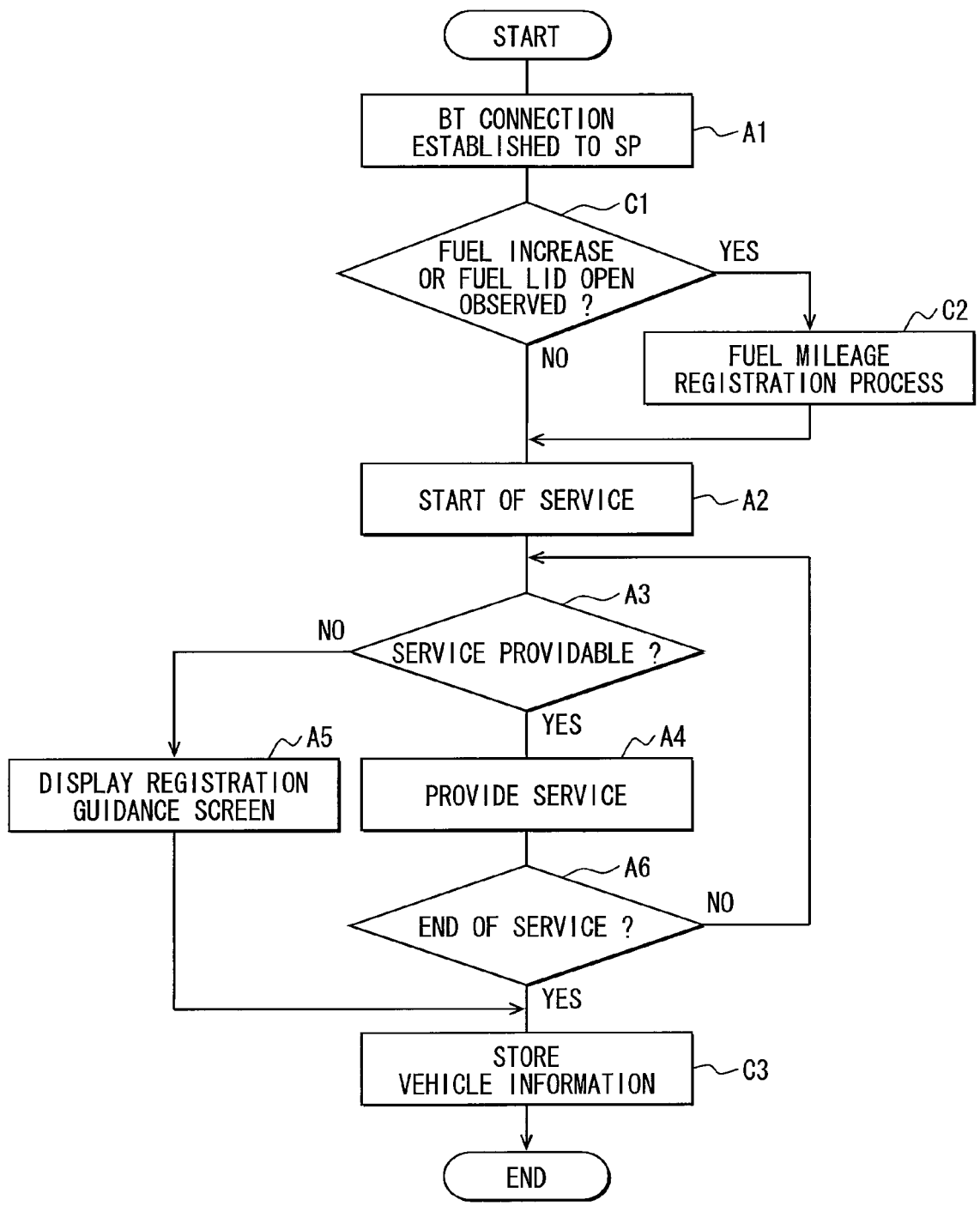
FIG. 12 is a flowchart of a control process performed by the vehicular device in a second embodiment.

The vehicular device 2 performs a process that is substantially equivalent to the one in FIG. 4 of the first embodiment, as shown in FIG. 12. Like numbers in FIG. 12 show like steps in FIG. 4 and the description of the like steps are omitted.

First, C3 of FIG. 12 is described. Since the vehicular device 2 is operated in synchronization with the power supply of the vehicle in the present embodiment, the power supply for the vehicular device 2 is stopped when the ACC (i.e., accessory) key is turned to an OFF position. When the power supply is turned off, the vehicular device 2 ends the provision of a currently-provided service (A6), and stores the vehicle information at the time of ACC off operation to the vehicle memory 15 (C3). In other words, during a period from ACC turning off to the stop of the power supply for the vehicle device 2, the vehicular device 2 stores vehicle information regarding the remaining fuel amount as well as whether the fuel lid has been opened/closed.

The remaining fuel amount is detected by the fuel sensor (i.e., sensor 8), and the opening/closing of the fuel lid is detected by the fuel lid sensor (i.e., sensor 8). Fueling even during the power supply turned off period, in which the supply of the electric power for the vehicular device 2 is turned off, may be recorded as information in the above-described manner by the fuel lid. The information regarding the remaining fuel amount and the opening/closing of the fuel lid may serve as fueling information in claims.

The next time the vehicular device 2 receives the power supply, that is, at the next turn on operation of the ACC key, the vehicular device 2 reads the vehicle information stored, which includes the fueling information, and determines whether the amount of fuel has increased or whether the fuel lid has opened/closed, at C1. In other words, in C1, the vehicular device 2 determines whether a fueling operation has been performed. If it is determined that the fuel has increased or the fuel lid has opened/closed (C1:YES), the vehicular device 2 performs the fuel mileage registration process of FIG. 7, at C2. That is, at the time of start up of the vehicular device 2, it automatically uses the fuel mileage service upon determining that the fueling has been performed. In such manner, the user is prevented from forgetting the fuel mileage service at the time of every fueling.

When the vehicular device 2 is movably installed in the vehicle compartment, the vehicle information may be stored at a time of user operation of a power supply switch of the vehicular device 2, instead of the ACC turn-off timing.

Third Embodiment

The third embodiment of the present disclosure is described in the following with reference to FIGS. 13-14.

In the third embodiment, the vehicle information is transmitted to the portable communication terminal 3, which is different from the first embodiment. Configuration of the vehicular device 2, the portable communication terminal 3, and the vehicular system 1 is same as the first embodiment.

Figure 13:
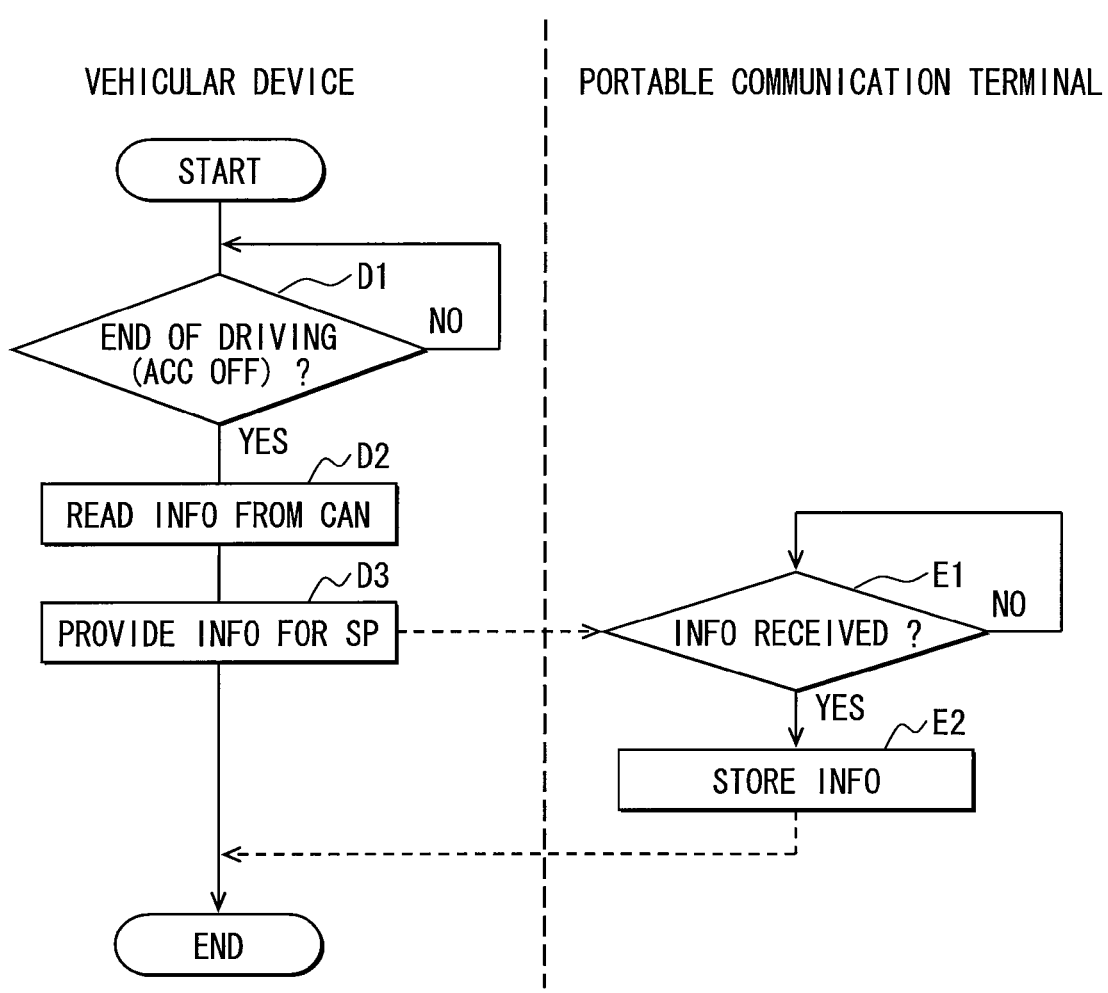
FIG. 13 is a flowchart of a transmission process of vehicle information to the portable communication terminal in a third embodiment.

With reference to FIG. 13, when the vehicle stops traveling (i.e., the ACC key is turned off) (D1:YES), the vehicular device 2 reads the vehicle information through CAN 9, at D2, and provides the vehicle information to SP. The portable communication termination 3 then determines, whether the vehicle information is received from the vehicular device 2, at E1, and upon receiving the vehicle information (E1:YES), the portable communication terminal 3 stores the vehicle information, at E2. At a time of storing the vehicle information, the portable communication terminal 3 need not be performing the same application.

Figure 14:
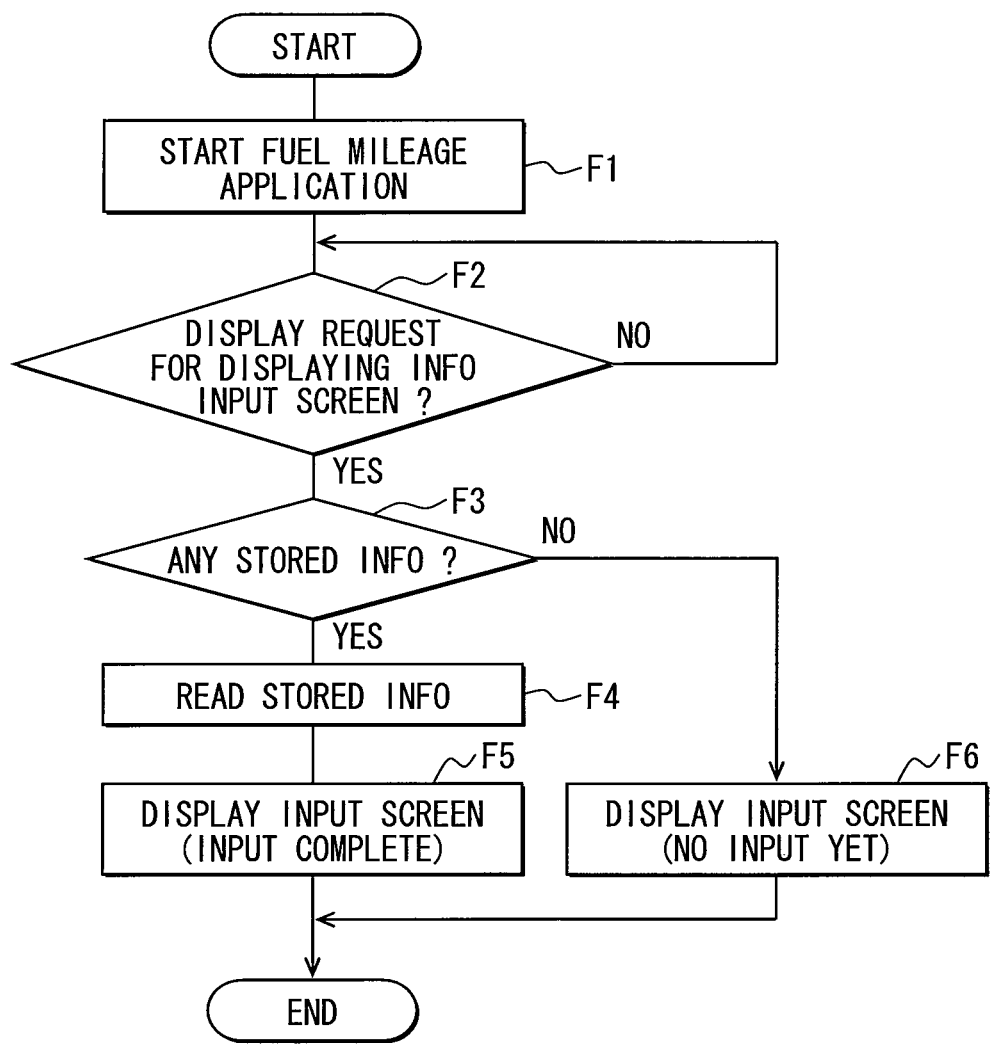
FIG. 14 is a flowchart of a control process of the portable communication terminal.

With reference to FIG. 14, after starting up of the fuel mileage application (i.e., an application for the fuel mileage service) at F1, the portable communication terminal 3 determines whether a display request for displaying the information input screen (i.e., an operation of the fuel mileage input button M3 in the fuel mileage input screen of FIG. 9) exists. If the display request for displaying the information input screen exists (F2:YES), it determines, at F3, whether vehicle information is available (i.e., vehicle information was provided and stored). If vehicle information exists (F3:YES), the portable communication terminal 3 reads the vehicle information, at F4, and, while displaying the fuel mileage input screen (FIG. 10), it automatically inputs the travel distance based on the vehicle information, at F5.

If the vehicle information is not available (F3:NO), the portable communication terminal 3 displays the fuel mileage input screen (see FIG. 10), and accepts a manual input from the user at F6.

When the portable communication terminal 3 is connected to the vehicular device 2 in the present embodiment in the above-described manner, by transmitting the vehicle information acquired by the vehicular device 2 to the portable communication terminal 3, the travel distance and the like are automatically inputted by the portable communication terminal 3 when the fuel mileage service is used via the portable communication terminal 3. In such manner, the cumbersomeness for the user is diminished.

Other Embodiments

Although the present disclosure has been fully described in connection with the preferred embodiment thereof with reference to the accompanying drawings, it is to be noted that various changes and modifications will become apparent to those skilled in the art.

For example, the amount of displayed information on the screen regarding the fuel mileage may be decreased, beside restricting the input and obscuring the displayed information. In such manner, the staring of the screen by the user is prevented, thereby improving the safety of driving.

Further, the vehicular device 2 may transmit the vehicle information to the portable communication terminal 3 upon having a request from the portable communication terminal 3.

Such changes and modifications are to be understood as being within the scope of the present disclosure as defined by the appended claims.

What is claimed is:

1. A vehicular device disposed in a vehicle and configured to execute a terminal application, the terminal application has a function in common with an application installed in a portable communication terminal and is used for using a service provided by an external server in cooperation with the portable communication terminal, the vehicular device comprising:
   a communication unit performing communication with the portable communication terminal;
   a display unit displaying an execution screen of the terminal application;
   an operation input unit receiving an input regarding an operation for a manual setting of information being used by the terminal application, the operation input unit being provided in a corresponding manner for the display unit;
   a vehicle information acquisition unit acquiring vehicle information regarding the vehicle, the vehicle information being used by the terminal application; and
   a control unit providing the vehicle information acquired by the vehicle information acquisition unit without using the input from the operation input unit for the execution of the terminal application, and controlling a transmission of the vehicle information to the external server through the portable communication terminal via the communication unit, wherein
   the terminal application is an application to use a fuel mileage information registration service provided by the external server through the portable communication terminal,
   the operation input unit receives the input for setting a fuel amount as information to be used by the terminal application,
   the vehicle information acquisition unit acquires a travel distance of the vehicle as the vehicle information,
   the control unit automatically sets the travel distance of the vehicle based on the vehicle information acquired by the vehicle information acquisition unit, transmits the travel distance and the fuel amount to the external server, and acquires a fuel mileage calculated by the external server through the portable communication terminal via the communication unit, and
   the display unit displays the fuel mileage as the execution screen.

2. The vehicular device of claim 1 further comprising:
a memory unit storing the vehicle information, wherein
the control unit stores the vehicle information in the memory unit in a period before a supply of an electric power to the vehicular device is stopped when an operation to stop the electric power is performed during a cooperative operation time of the vehicular device with the portable communication terminal, and
the vehicle information stored in the memory unit is compared with newly-acquired vehicle information and a change of the vehicle information is used for the terminal application when the supply of the electric power for the vehicular device is started.

3. The vehicular device of claim 1, wherein the control unit transmits the vehicle information to the portable communication terminal when the vehicular device is operating in a cooperative manner with the portable communication terminal.

4. The vehicular device of claim 1, wherein the vehicle information acquisition unit acquires, as the vehicle information, fueling information that indicates whether the vehicle has been fueled.

5. The vehicular device of claim 1, wherein
the vehicle information acquisition unit further acquires, as the vehicle information, information that indicates whether the vehicle is currently traveling, and
the control unit performs at least one of a restriction of the operation input unit to restrict the input of the operation and a reduction of the amount of information provided on the execution screen by the display unit when the vehicle information indicates that the vehicle is traveling.

6. The vehicular device of claim 1, wherein
the vehicle information acquisition unit acquires vehicle information regarding the vehicle when the operation is input to the execution screen that is displayed on the display unit.

7. The vehicular device of claim 1, wherein
the communication unit communicates with the portable device via a local area communication network.

8. The vehicular device of claim 7, wherein
the local area communication network operates using the Bluetooth standard.

9. A portable communication terminal configured to operate in a cooperative manner with a vehicular device that acquires vehicle information regarding a vehicle, and configured to execute a terminal application that is commonly used with the vehicular device for using a service provided by an external server, the vehicular device including a vehicle information acquisition unit acquiring vehicle information regarding the vehicle, the vehicle information being used by the terminal application, the portable communication terminal comprising:
a communication unit performing communication with the vehicular device and acquiring the vehicle information;
a display unit displaying an execution screen of the terminal application;
an operation input unit receiving an input regarding an operation for a manual setting of information being used by the terminal application, the operation input unit being provided in a corresponding manner with the display unit; and
a control unit automatically setting, to the terminal application, information to be used by the terminal application from among the vehicle information acquired by the vehicle information acquisition unit, the automatic setting of such information being performed without using the input from the operation input unit when the terminal application is being executed using the vehicle information, wherein
the terminal application is an application to use a fuel mileage information registration service provided by the external server,
the operation input unit receives the input for setting a fuel amount as information to be used by the terminal application,
the vehicle information acquisition unit acquires a travel distance of the vehicle as the vehicle information,
the control unit automatically sets the travel distance of the vehicle based on the vehicle information acquired by the vehicle information acquisition unit, transmits the travel distance and the fuel amount to the external server, and acquires a fuel mileage calculated by the external server through the portable communication terminal via the communication unit, and
the display unit displays the fuel mileage as the execution screen.

10. The portable communication terminal of claim 9 further comprising:
a memory unit storing the vehicle information, wherein
the vehicular device transmits the vehicle information to the portable communication terminal at one of a regular timing, a requested timing, and a time of performing an electric power supply shut-off operation for stopping a supply of electric power for the vehicle, when the vehicular device is operating in a cooperative manner with the portable communication terminal, and
the control unit performs an automatic control that automatically sets, to the terminal application, the information to be used by the terminal application from among the vehicle information stored in the memory unit, the automatic setting of such information is performed without using the input from the operation input unit, when the control unit initiates the terminal application for using the vehicle information.

11. The portable communication terminal of claim 9, wherein
the vehicle information acquisition unit acquires vehicle information regarding the vehicle when the operation is input to the execution screen that is displayed on the display unit.

12. The portable communication terminal of claim 9, wherein
the communication unit communicates with the vehicular device via a local area communication network.

13. The portable communication terminal of claim 12, wherein
the local area communication network operates using the Bluetooth standard.

14. A portable communication terminal configured to operate in a cooperative manner with a vehicular device that acquires vehicle information regarding a vehicle, and configured to execute a terminal application that is commonly used with the vehicular device for using a service provided by an external server, the portable communication terminal comprising:
a communication unit performing communication with the vehicular device and with an external server acquiring the vehicle information;
a display unit displaying an execution screen of the terminal application;
an operation input unit receiving an input regarding an operation for a manual setting of information being used by the terminal application, the operation input unit being provided in a corresponding manner with the display unit; and a control unit automatically setting, to the terminal application, information to be used by the terminal application from among the vehicle information acquired by the vehicle information acquisition unit, the automatic setting of such information being performed without using the input from the operation input unit when the terminal application is being executed using the vehicle information, wherein the communication unit acquires vehicle information from the vehicular device and sends the vehicular information to the external server, and the communication unit acquires fuel mileage information from the external server, and sends the fuel mileage information to the vehicular device.

15. The portable communication terminal of claim 14, wherein the communication unit communicates with the vehicular device via a local area communication network, and the communication unit communicates with the external server via a wide area communication network.

16. The portable communication terminal of claim 14, wherein the local area communication network operates using the Bluetooth standard, and the wide area communication network is a public line network.

* * * * *